DAVID J. SWEIGART
PHILIP W. CARMACK,
*INVENTORS.*

BY S. J. Rotondi
A. T. Dupont
Alfred E. Smith,

DAVID J. SWEIGART
PHILIP W. CARMACK,
*INVENTORS.*
S. J. Rotondi
BY A. T. Dupont
Alfred E. Smith, Jan. 5, 1965 D. J. SWEIGART ETAL 3,164,076

IMAGE INTERCEPT TRACKING DEVICE

Filed Jan. 14, 1963 8 Sheets-Sheet 3

DAVID J. SWEIGART
PHILIP W. CARMACK,
*INVENTORS.*

BY S. J. Rotondi
a. T. Dupont
alfred E. Smith,

DAVID J. SWEIGART
PHILIP W. CARMACK,
*INVENTORS.*
BY S. J. Rotondi
A. T. Dupont
Alfred E. Smith, DAVID J. SWEIGART
PHILIP W. CARMACK
INVENTORS.
BY S. J. Rotondi
A. T. Dupont
Alfred E. Smith, DAVID J. SWEIGART
PHILIP W. CARMACK,
*INVENTORS.*
BY S. J. Rotondi
A. T. Dupont
Alfred E. Smith,

IMAGE INTERCEPT TRACKING DEVICE

Filed Jan. 14, 1963 8 Sheets-Sheet 7

DAVID J. SWEIGART
PHILIP W. CARMACK,
*INVENTORS.*
S. J. Rotondi
BY A. T. Dupont
Alfred E. Smith,

SERVO-SYSTEM

DAVID J. SWEIGART
PHILIP W. CARMACK,
INVENTORS.
BY S. J. Rotondi
A. T. Dupont
Alfred E. Smith,

United States Patent Office 3,164,076
Patented Jan. 5, 1965

3,164,076
IMAGE INTERCEPT TRACKING DEVICE

David J. Sweigart and Philip W. Carmack, Huntsville, Ala., assignors to The United States of America as represented by the Secretary of the Army Filed Jan. 14, 1963, Ser. No. 251,450
10 Claims. (Cl. 95—36)
(Granted under Title 35, U.S. Code (1952), sec. 266)

The invention described herein may be manufactured and used by or for the Government for governmental purposes without the payment of any royalty thereon.

The present invention relates to an image intercept tracking device for daylight use.

At present, there is one device whose purpose is to equip the cameras of a ballistic camera system for daylight use, which is called a "sky screen." This device is installed in the camera and utilizes two full field focal plane shutters, back to back, mounted on rollers capable of driving them across the film plane at right angles to each other. Each shutter is equipped with a slit aperture oriented at right angles to the direction of motion. The slit apertures, equalling in length the appropriate film dimensions, allow the film to be exposed at their intersection. The position of the intersection is varied to track an image across the film plane by driving the shutters in the proper directions and at the appropriate velocities. Shutter motion speed and direction is controlled by a mechanical analog computer. The computer input is derived from a single tracking telescope.

The present invention also utilizes the common principle employed by the "sky screen." Namely that restriction of the exposed portion of a ballistic plate to a small area immediately surrounding the moving image will prevent the exposure saturation otherwise caused by ambient daylight. This renders the camera suitable for use during daylight hours.

The image intercept tracking device, to be described herein, operates under entirely different structural and mechanical principles and accommodates two images rather than one. Basically, the camera-mounted device utilizes a half-section assembly including a pair of aperture members movably mounted upon the lens barrel of the camera. The aperture members are, both individually and as a unit, driven by the motion of two control telescopes operating through a unique array of mountings and servomechanisms. Each aperture member is forced to duplicate precisely the motion of its control telescope. The most important advantage of the image intercept tracker lies in the fact that it can be used to obtain ballistic track data during daylight tests involving a killer missile and its target. Trajectories of both missiles are traced on each plate of the system stations.

The desirability of data of this type is manifest. No known device other than the one herein described will accomplish the desired results during daylight tests. In addition, the device is designed to be retractable. In its retracted position it will not interfere with standard night time operation of the camera in which it is installed. It is also capable of remotely controlled re-introduction. Thus, it can be retracted while a full field start calibration is made to secure precise position and orientation data. Then the device can be re-introduced into the system without necessity for touching or disturbing the camera. In this manner validity and precision of the star calibration data are in no way impaired.

With suitable ancillary equipment, the camera stations can be ship or air borne with little loss in the systems data accuracy. This feature is most important in the Atlantic and Pacific ocean impact areas where cloud cover and great expanses of water conspire to make a land-based ballistic camera system impractical.

It should be emphasized here that tracking telescope mounts, conic section drive controls and arrangement of the servo system are integral to this invention. Although standard mechanical and electrical components are employed, the arrangement and purpose are unique.

It is an object of this invention to provide daylight photometric information involving two dynamic objects.

A further object of this invention is to provide a device for simultaneously recording the images and trajectories of a killer missile and its target.

A still further object of this invention is to provide a device for restricting the exposed portion of a film plate to a small area immediately surrounding the images to be recorded.

Another object of this invention is to provide a novel telescope mounting assembly for use in an image intercept tracking device.

The foregoing and other objects of this invention will become more fully apparent from the following detailed description and from the accompanying drawings, in which.

Figure 1:
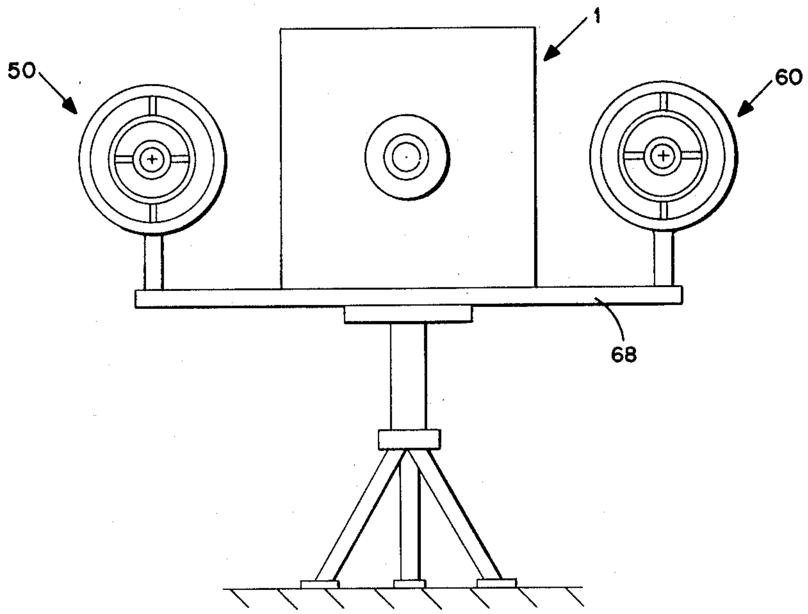
FIGURE 1 is a front view of a camera station.

The general arrangement of a camera station according to the invention is illustrated in FIGURE 1 wherein a platform 68 carries a camera 1 and telescope assemblies 50 and 60 mounted one on each side of the camera. The telescopes are movably mounted and have their rotational axes located on a line passing through the rear nodal point of the camera lens.

Figure 2:
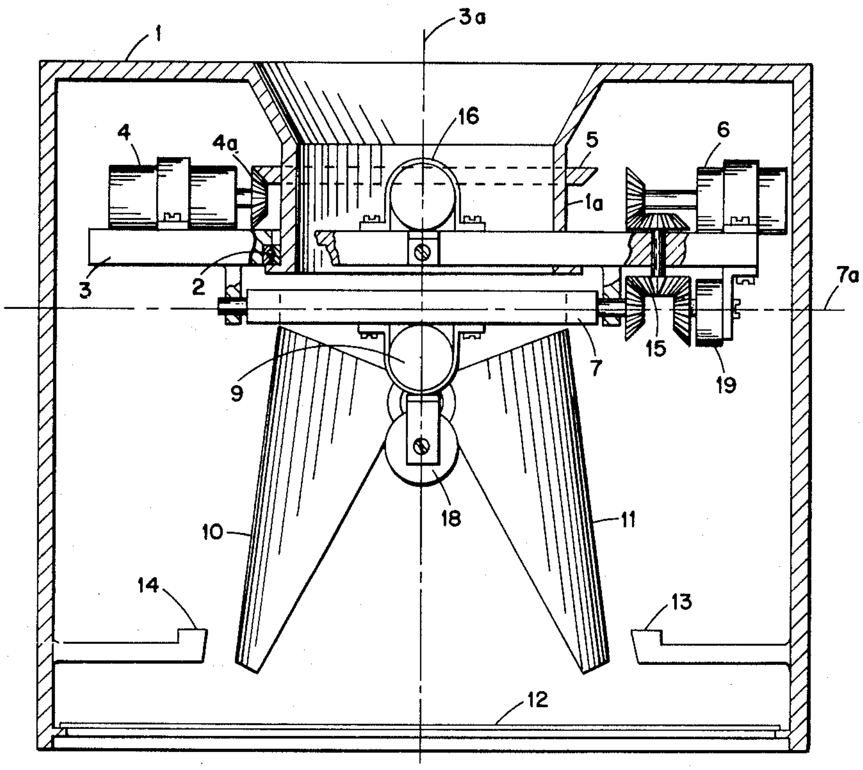
FIGURE 2 is a side elevational view, partly broken away, of a camera according to the present invention.
Figure 3:
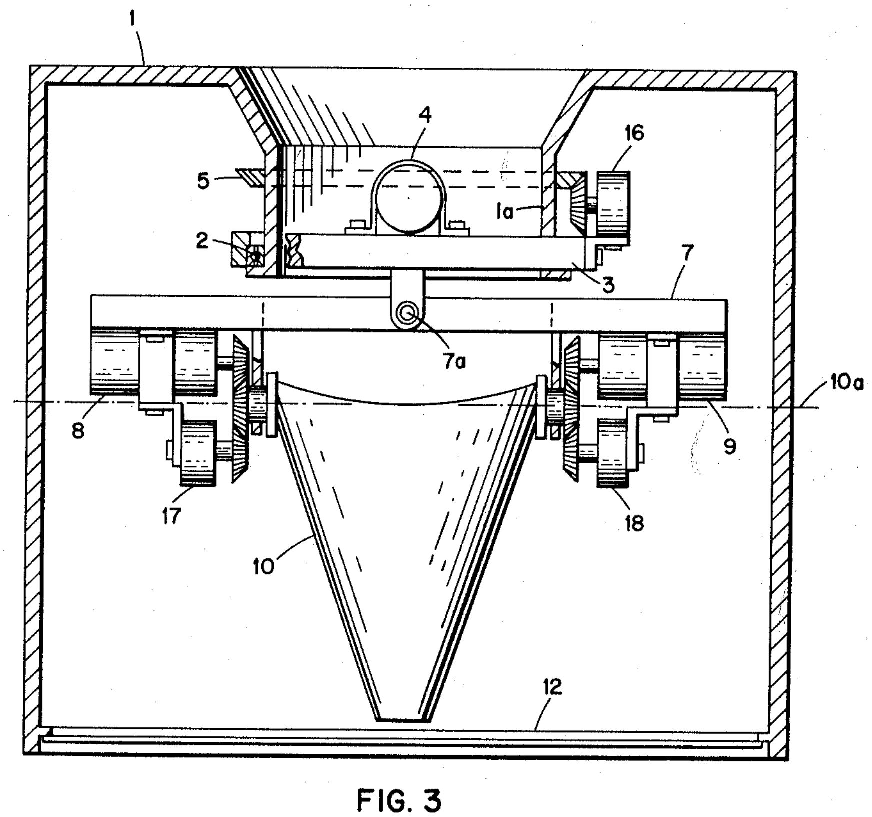
FIGURE 3 is an additional side elevational view similar to FIGURE 2.

One embodiment of the invention which utilizes a half-section assembly formed by axially splitting a frustum of a hollow, right circular cone providing two half-sections 10 and 11 is illustrated in FIGURES 2 and 3. The two half-sections have their large ends supported adjacent camera lens barrel **1*a* and taper to the film plane. The end located at the film plane forms a semi-circular aperture, for each half-section, through which light is allowed to reach film plate 12. The entire camera half-section assembly is suspended from a main platform 3 which is carried by a main support bearing 2 mounted on the lens barrel. Platform 3 is driven about axis 3*a* by a primary motor 4 carried by the platform and having a gear 4*a* for acting against ring gear 5, which is rigidly attached to the lens barrel. A secondary motor 6 is also mounted on platform 3 and acts through a gearing arrangement 15 to drive secondary platform 7 about an axis 7*a* normal to axis 3*a*. Mounted on the underside of the secondary platform is a pair of motors 8 and 9** (FIGURE 3) for driving half-sections 10 and 11, respectively, about axis 10*a* normal to both axes 3*a* and 7*a*.

All drive motors 4, 6, 8, and 9 are slaved to the two control telescopes 50 and 60 and operate only when the scopes are in motion. Potentiometers 16, 17, 18, and 19 function in the balance network of a servo system for a purpose which will be described below. Through the proper control approaches, each half-section can be driven to trace across the film plate a path which is independent of the position or motion of the other half-section. Note that the orientation of each half-section is by no means independent of the position or orientation of the other, but that, because of the arrangement of the driving and mounting mechanisms, there are an infinite variety of positions which a half-section can assume in "looking" at a given spot on the film plate.

When it is desirable to remove the mechanism from its position in the lens cone, half sections 10 and 11 can be retracted to, and held by magnetic latches 13 and 14 (FIGURE 2). This action is desirable for star calibration or other night time use of the camera for which the lens requires access to the full film plane.

When the half-sections are in divergent positions, it is necessary to prevent light transmission through the extended opening directly between the apertures at the narrow ends of the half sections. However, when the half-sections are in conjunction, as they would be at intercept or near intercept of the images they are tracking, the apertures must merge completely to prevent loss of intercept data.

As the half-sections converge, it is desirable that the apertures remain separate as long as is possible. Merging of the apertures creates a single opening of approximately twice the optimum size and the duration of existence of this double size opening must be kept to a minimum.

Figure 4:
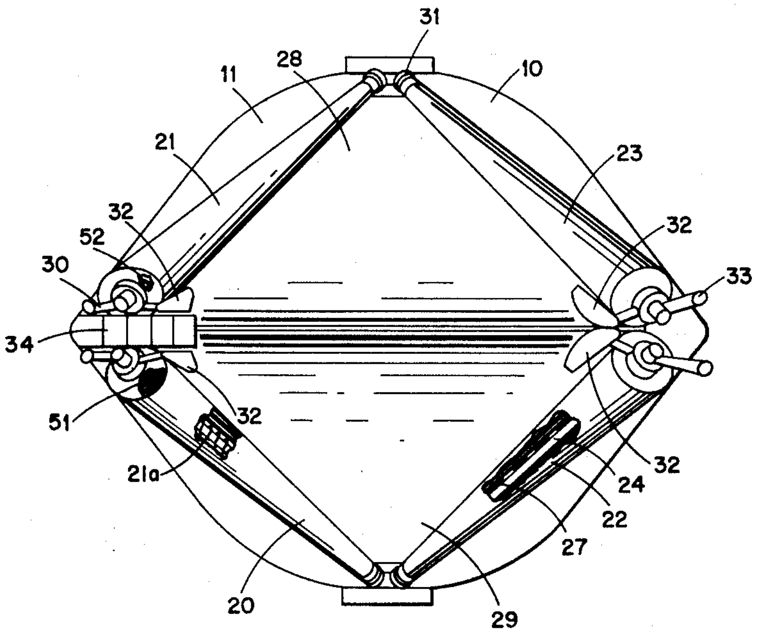
FIGURE 4 is a bottom view of a half-section assembly according to the present invention.
Figure 5:
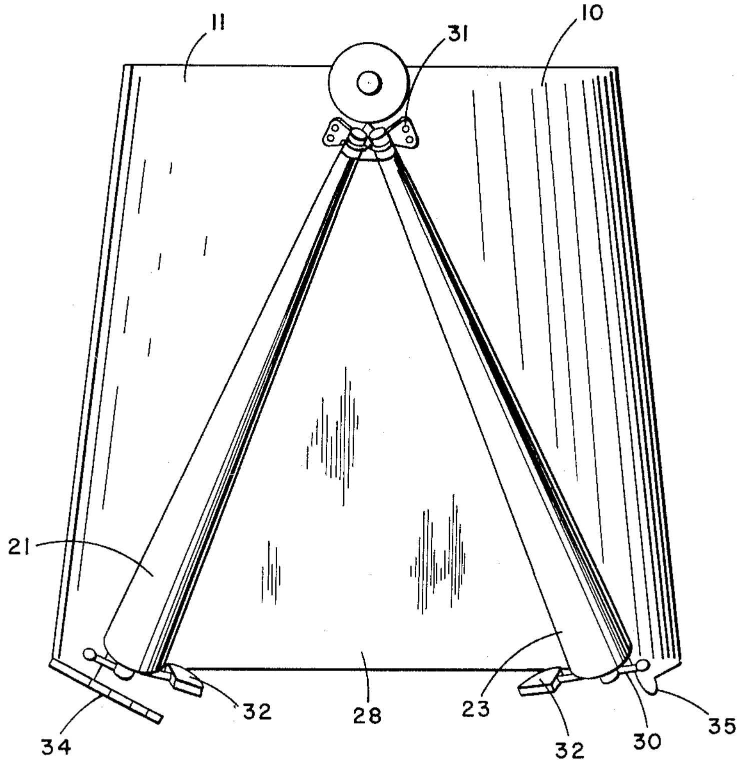
FIGURE 5 is a side view of the half-section assembly.

Referring to FIGURES 4 and 5 there is represented an ancillary screening mechanism for accomplishing these desiderata having cone shaped rollers 20, 21, 22, and 23 are mounted on the facing edges of each half-section. Two of the rollers 20 and 21 are equipped with internal springs 20′ and 21′ which load them for rotation about their axes. Opaque, rubberized cloth panels 28 and 29 are fastened along clips 51 and 52, which extend along the length of the rollers, and rolled onto rollers 20 and 21. The panels are magnetically clamped to rollers 22 and 23. As the half-sections diverge, clamps 24 and 25 on rollers 22 and 23 maintain their grips on magnet clamps 26 and 27 of panels 28 and 29 and the panels are caused to unroll from rollers 20 and 21, thus closing the triangular side openings. Magnetic clamps 24 and 25 extend the full height of the panels and rollers. Magnets 26 and 27 are sewn into the panel ends and set into grooves in the rollers. Rollers 22 and 23 are frozen on their axes and roll out only in conjunction with the action of pivot arms 30. As the half-sections move toward conjunction the spring loading causes the panels to be rolled onto rollers 20 and 21. When the half-sections diverge, the cloth panels meet at the bottom and close the extended opening between the apertures at the bottom of the half sections.

The lower end of each roller is mounted on an arm 30 which pivots about the forward corner of the aperture on a cam 32 which is attached to arms 30. The upper, tapered end of each roller is mounted in a swivel joint 31. In addition, each pivot arm is fitted with a spring 33 which loads it toward a line from the center of one aperture to the center of the other.

When the half-sections are in a divergent position, springs 33 on the pivot arms force roller 20 against roller 21 in the central position. The same is true of rollers 22 and 23. As the half-sections approach conjunction, the opposing cams meet, and the rollers are forced to swing aside. As the rollers move to the sides, panels 28 and 29 separate and the passage between them merges with the apertures at the ends of the half-sections, forming a single long narrow opening.

Figure 6:
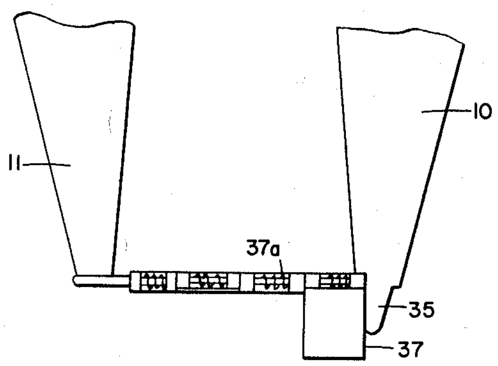
FIGURE 6 is a front view of a segmented trapping device.
Figure 7:
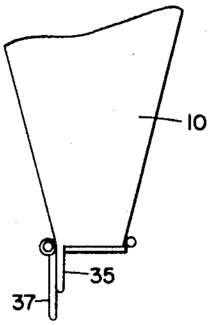
FIGURE 7 is a side view of the segmented trapping device.
Figure 8:
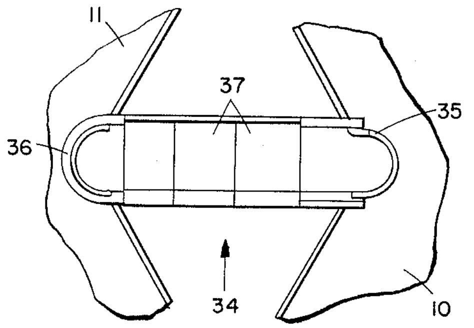
FIGURE 8 is a bottom view of the trapping device.

As previously stated, it is desirable that this ultimate merging of the apertures be delayed as long as possible. To accomplish this delay, a secondary device, represented in FIGURES 6, 7, and 8, is employed. Note that regardless of the overall orientation of the screening mechanism, the half-sections are permanently oriented in the same plane with respect to each other and that their approach is always a direct, facing approach. A segmented trapping device 34 is provided with a U-shaped member 36 having its bight portion secured to the lower end of half-section 11. The U-shaped member has a series of springs 37*a* mounted thereon for biasing plates 37 pivotally mounted on a leg thereof for cooperating with a cam member 35 mounted on half-section 10. When cams 32 meet and force pivot arms 30 to swing aside, the resulting aperture is closed by this trapping device. As the half-sections continue to approach, cam 35 forces successive segments of the trapping device to swing down and to the side. At the closest approach, the final segment is forced aside and ultimate merging of the aperture occurs.

As the half-sections diverge, cam 35 allows the segments of the trapping device to re-impose themselves in the opening. When sufficient divergence is reached, panels 28 and 29 are forced into place. Thus all undesired openings are eliminated.

Figure 9:
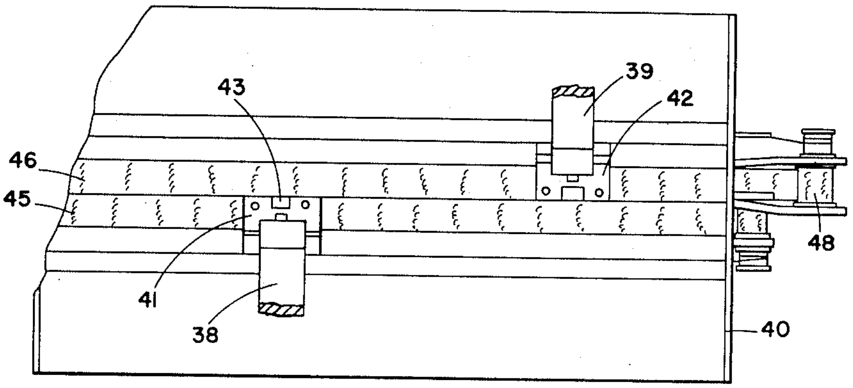
FIGURE 9 is a top view of a modification of the half-section assembly.
Figure 10:
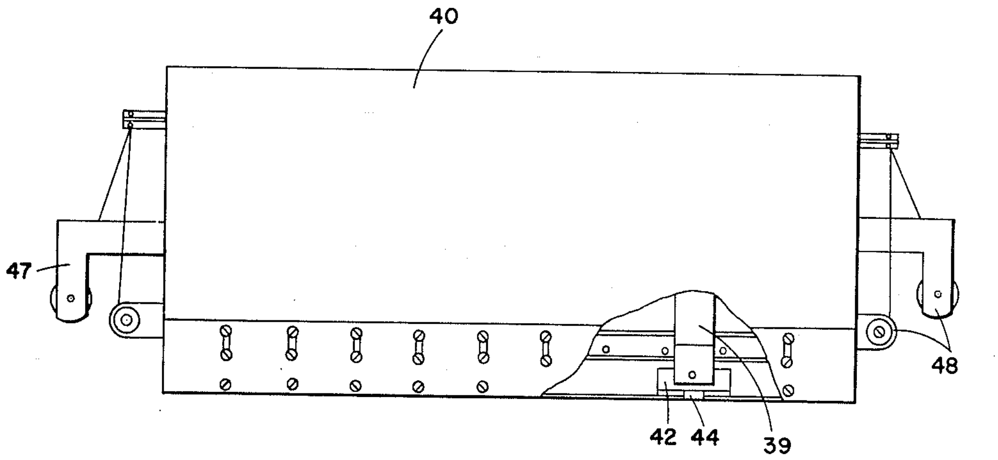
FIGURE 10 is a side elevation, partly broken away, of the modified half-section assembly.

FIGURES 9 and 10 illustrate a modification of the half-section assembly in which a skirt assembly replaces the cone shaped half-sections and ancillary screening mechanisms. The general shape of the skirt 40 is that of a wide, blunt wedge, open at the bottom, which tapers to the film plane. It acts both as a light trap and as a holder for the tracking apertures.

Drive motors 8 and 9 direct drive aperture control arms 38 and 39 which in turn drive aperture plates 41 and 42 which are affixed to slightly overlapping screening ribbons 45 and 46.

As the aperture control arms 38 and 39 are driven to move the aperture plates along the bottom of the skirt assembly, the screening ribbon is pulled off roller 47 while slack is taken up by roller 48. The aperture plates ride in a track built onto the skirt edge. The control arms are equipped with telescoping ends which allow apertures 43 and 44 to track in a plane rather than along an arc. When the apertures arrive at conjunctive positions, they merge to become a single opening. There is sufficient tension on all rollers to allow full aperture traverse in both directions without slack in the screening ribbons.

The tracking telescope assemblies 50 and 60 combine to control certain aspects of the orientation of one another, and the extent of swing of each half-section about axis 10*a*.

Figures 11, 13:
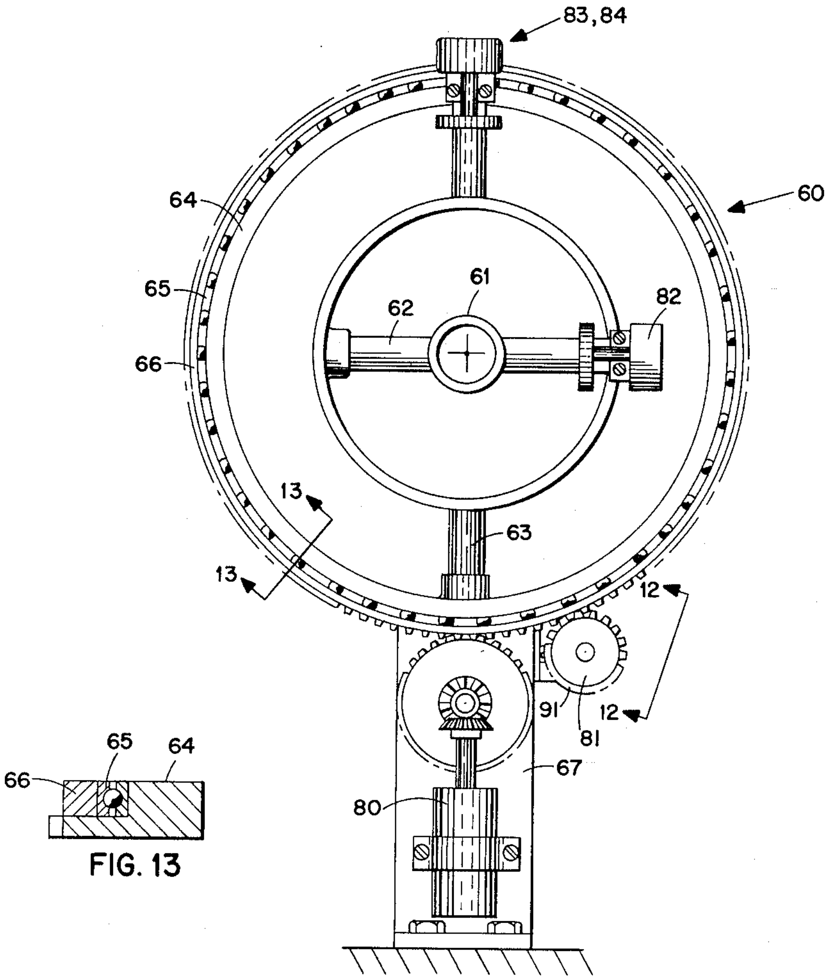
FIGURE 11 illustrates the telescope mounting assembly with associated controls.
FIGURE 13 is a sectional view along the line 13—13 of FIGURE 11.

In general the mechanism for each tracking telescope is identical. However, because of the servomechanism array, some features are peculiar to each. Both tracking telescopes are low power, wide field devices with cross hairs to establish the optical axis. Referring to FIGURE 11, telescope 61 is mounted on a trunnion 62 which limits its motion to rotation in a plane about the trunnion axis. This central trunnion 62 is mounted in an outer trunnion 63. The axis of the trunnions are perpendicular. The outer trunnion 63 allows the scope an additional degree of rotational freedom. Outer trunnion 63 is mounted in an inner bearing race 64, which has a toothed flange thereon and is separated from outer race 66 by a ball bearing 65. This permits the scope a further degree of freedom by enabling the entire double trunnion assembly to rotate about the support bearing axis.

Differences between the two tracking scope mounts are necessitated by the concept of control and slave mechanisms employed. The axis of the inner trunnion is geared to drive potentiometer 82 on assembly 60 (FIG- URES 11 and 14). The outer trunnion is geared to drive potentiometers 83 and 84 on assembly 60. Inner race 64 is geared to be driven by motor 80 and to drive potentiometer 81.

Figure 12:
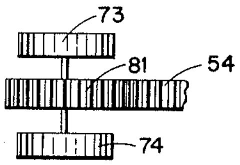
FIGURE 12 is a view along the line 12—12 of FIGURE 11.

The array is only slightly different for scope assembly 50. The axis of the inner trunnion is geared to drive potentiometer 72, outer trunnion drives potentiometer 71 and the inner race is driven by motor 70 and, in turn, drives potentiometers 73 and 74. FIGURE 12 illustrates the arrangement for driving potentiometers 73 and 74 on scope assembly 50.

Figure 14:
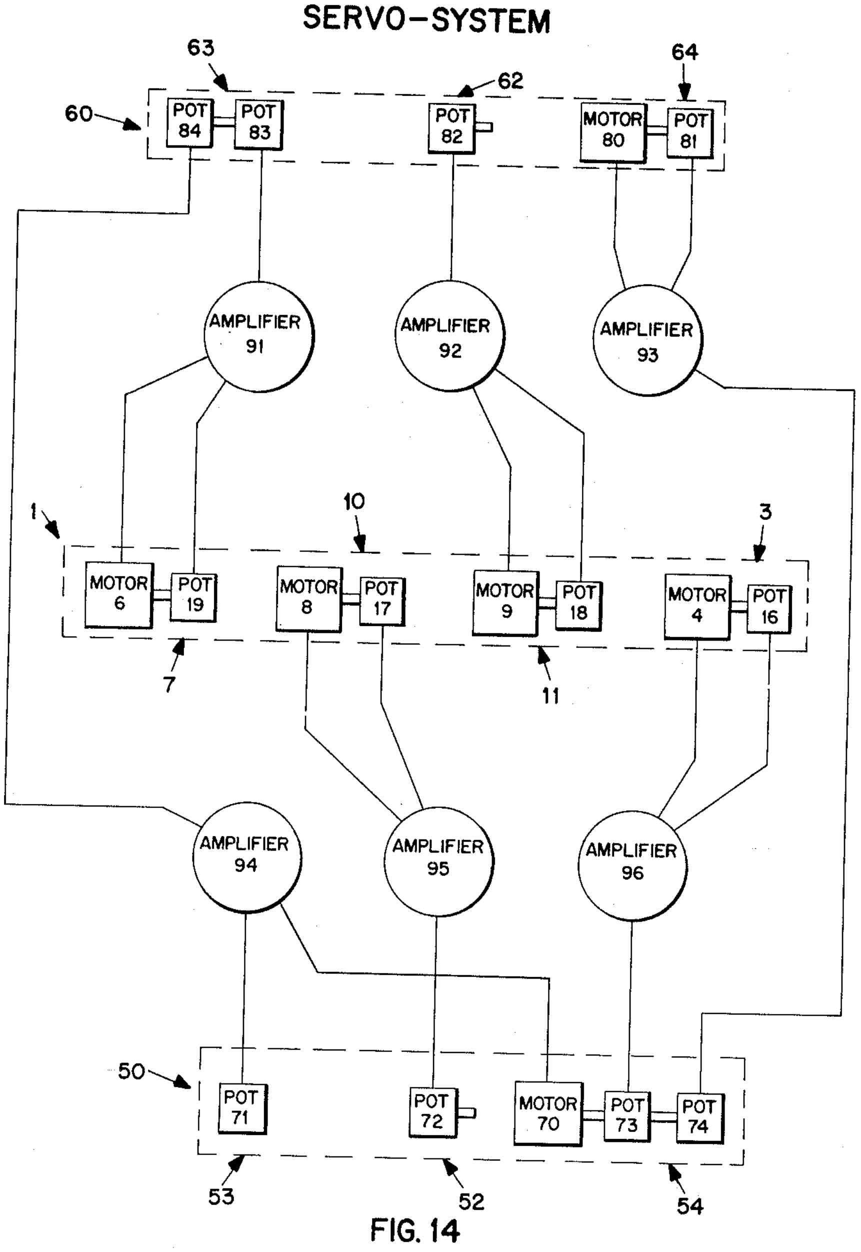
FIGURE 14 is a block diagram illustration of a control system according to the invention.

As illustrated in FIGURE 14 the basic electro-mechanical device employed is a standard servo-system in which one motor and two potentiometers are wired in a circuit with amplifier and balancing unit.

As long as both potentiometers exert the same resistance to current flow, the circuit is balanced and the motor does not drive. Ordinarily the "slave" poteniometer is geared to the motor. The "control" potentiometer is actuated directly. If the resistance of the control potentiometer is varied, the imbalance in the system is immediately transmitted to the motor in the form of a drive impulse. The motor, driving, varies the resistance of the slave potentiometer until the circuit is again balanced. Suitable gearing in conjunction with potentiometers of good resolution produces a system capable of rapid, powerful response and excellent precision. Six such identical circuits are incorporated in this device.

Potentiometer 72, driven by the inner trunnion axis of scope 50, is the control potentiometer for motor 8 and slave potentiometer 17 of half-section 10 or aperture plate 41. Thus all rotation of scope 50 about the axis of its inner trunnion 52 is precisely duplicated by a rotation of half-section 10 or aperture plate 41.

Similarly, potentiometer 82 driven by the inner trunnion axis of scope 60 is the control potentiometer for motor 9 and slave potentiometer 18 of half-section 11 or aperture plate 42. Any rotation of scope 37 about the axis of its inner trunnion 62 is precisely duplicated by a rotation of half-section 11 or aperture plate 42.

Potentiometers 83 and 84, driven by the outer trunnion of scope 60 are both control potentiometers. One controls motor 70 for driving the inner race of bearing 56. The other controls secondary drive motor 6 and slave potentiometer 19 for secondary platform 7 of the camera-mounted half-section assembly.

Rotation of bearing race 54 drives the two control potentiometers 73 and 74. One is the control potentiometer for motor 80 and slave potentiometer 81. The other is the control potentiometer for primary drive motor 4 and slave potentiometer 16 of the camera-mounted half-section assembly. Bear in mind that all slave potentiometers perform the standard balancing function previously described.

Taken as a complete system, bearings 56 and 66 of tracking scope assemblies 50 and 60, respectively, and the primary platform 3 of the camera-mounted half-section assembly all rotate the same amount, in the same plane, at the same time. Reflexive control of the motion of bearing race 54 is the master control for this aspect of the system.

Similarly, manual control of the rotation about the axis of trunnion 63 of scope 61 is the ultimate master control for bearing race 54 of scope assembly 50 and the secondary platform 7 of the camera-mounted half-section assembly. These components rotate the same amount, in the same plane, at the same time.

However, motion of half-section 10 or aperture plate 41 is individually controlled by the motion of scope 51 about the axis of its inner trunnion 52. Motion of half-section 11 or aperture plate 42 is individually controlled by the motion of scope 61 about the axis of its inner trunnion 62.

There is a zero control position for all components. The monopod mounts for tracking scopes 51 and 61 are fixed with respect to the camera, and the calibrate set position aligns both scope axes to meet the optical axis of the camera lens at infinity. At this position, all movable platforms and trunnions are oriented in a plane perpendicular to the optical axis; half-sections 10 and 11 or apertures 45 and 44, are in conjunction and the single, slightly elongated aperture is centered on the film plane. The servo array employed causes the scope mounts to form, effectively, a single unit which drives a duplicate unit, the camera-mounted half-section assembly, to follow all control motions with great precision.

The operation of this device is as follows: the station is so oriented that the camera views that portion of the sky where the anticipated action will occur. Each scope is oriented toward the extreme edge of the view field in the direction from which its body of interest is scheduled to appear. It is not at all necessary that these locations be known precisely nor that the time of appearance of the bodies of interest be the same.

Ballistic photography is accomplished from such a distance that the angular velocity of the ballistic body is very small and the field of view of the camera very large.

To gain a clear picture of the sequence of operational events, assume that the target missile is the first to appear and that it is outside the camera view field, but within the field of the scope assigned to it. The operator of this scope changes, if necessary, the scope orientation until it is in a position which places the cross hair directly in the path of the missile under inspection. If the interceptor has not appeared, the operator of the scope assigned that mission simply "sits tight." As the operator of the scope assigned to the target missile moves into position, the other operator will feel minute forces at work on his scope. These forces are brought about by the compensating actions of the mechanical components under the direction of the servo array. These forces are easily overcome by simply holding the scope in place. Compensation is automatic and is taken up by action of the trunnions and bearings. Within the camera, the half-section which is slaved directly to the scope assigned the target missile is driven to follow the control action of that scope. The other half-section, though driven to change certain aspects of its orientation, continues to point at the same spot on the film plane as controlled by the basic stasis of its control scope. As the target missile passes under the cross hair of the scope assigned to it, the scope operator begins to track and keeps the missile under the cross hair.

When the target missile passes under the cross hair, its image is focused by the lens to fall on the film plane through the aperture at the end of the proper half-section. As the image moves across the film, the aperture moves with it, directed by the scope tracking the missile across the sky.

When the interceptor enters the field, the operator of the scope assigned this mission duplicates the action of the other operator as previously described.

The bearings and the outer trunnions of both scope assemblies, and the primary and secondary platforms of the camera-mounted assembly gyrate and rotate in unison while the individual scopes and half-sections continue to track their respective missiles and images. Each operator will be aware of the compensating forces at work on his scope mount but will not be positively affected by them. Positive control of the line of sight of his scope is the operator's sole concern. The compensating forces will not hinder his function as prime control of this line of sight.

Should the interceptor missile fail to find its target, each operator continues to track until his assigned missile passes from the field of view.

Should the missile trajectories apparently cross, both missiles will be visible to both operators at the time of intercept. Each operator continues to track his assigned missile until the two bodies merge under his cross hair.

Now if the collision is not real, that is if the trajectories intersect only in the plane of view of the camera, the missiles will, of course, emerge from their apparent union and continue, each along its own trajectory. It is necessary, when this occurs if using the half-section assembly of FIGURES 2–8, that the operators exchange missions. The operator of the scope which has been tracking the target missile must begin tracking the interceptor; the operator who has been tracking the interceptor must begin tracking the target. If, after an apparent intercept, each operator continues to track the missile to which he was previously attentive; the mechanism will stall and no further data will be gathered. This is true regardless of the angle of intercept.

As the trajectories approach, the half-sections will move toward conjunction. When the approach reaches the critical point, cams 32 on the pivot arms 30 will meet and the rollers and rubberized panels 28 and 29 will be forced aside. Cam 35 will force the successive segments of the trapping device downwardly until intercept occurs and the half-sections merge completely.

After mission exchange, the half-sections diverge in accordance with the action of the control scopes. The springs on pivot arms 30 force the rollers and rubberized panels toward the center as cam 35 allows successive segments of the trapping device to fall home. The half-section apertures again become separate openings, each tracking an individual image across the remainder of the film plane.

When power to the device is turned off, all components become independent. Therefore, magnetic latches are furnished for locking all components before power is removed. This prevents mutual disorientation of components and removes necessity for involved re-alignment before each shot.

The operation of the device utilizing the skirt assembly, of FIGURES 9 and 10, is the same except that the mission exchange function is not required since the apertures may continue across the film plane after they merge.

When it is desired to make a star calibration for precise orientation and alignment all components are moved to latching position and power is removed. The film holder is removed, the magnetic clamps holding the rubberized panels to the rollers are opened. The full field of the lens is thus allowed to reach the film plane. The film pack is installed, the shutter opened and pictures made for the star calibration. When the image intercept tracking device is to be used, power is re-connected to the servo system circuit. The scopes are moved to the system infinity position. The half-sections driven by the scopes, are caused to merge. When the magnetic clamps on rollers 22 and 23 meet the magnetic clamps on the panels, they latch. As the half-sections then, are driven to diverge, the magnetic latch causes the rubberized panels to be rolled off rollers 20 and 21. Closing of all undesirable apertures is automatically accomplished as previously explained.

While the invention has been described with reference to the preferred embodiments thereof, it will be apparent that various modifications and other embodiments thereof will occur to those skilled in the art within the scope of the invention. Accordingly we desire the scope of our invention to be limited only by the appended claims.

We claim:

1. An image intercept tracking device for simultaneously obtaining trajectory traces for a plurality of missiles comprising: a camera for recording the missile trajectories and images; a lens mounted on said camera; a film plate carried by said camera; a plurality of telescopes movably mounted for rotation about an axis adjacent said camera for tracking said missiles, said telescopes having their rotational axes lying upon a line passing through the rear nodal point of said lens; means within said camera defining a plurality of apertures for restricting the exposed portions of said plate to a small area immediately surrounding the images; and control means interconnecting said aperture defining means and said telescopes and responsive to the movement of said telescopes for forcing said apertures to duplicate precisely the motion of said telescopes.

2. A device as set forth in claim 1, including a plurality of telescope mounting assemblies, each assembly comprising a support bearing assembly having an outer race, an inner race mounted for rotation about a first axis and ball bearings supported between said races, a first trunnion carried by said inner race for movement about an axis along a diameter of said inner race and normal to said first axis, and a second trunnion carried by said first trunnion for movement about an axis normal to said first and second axes.

3. An image intercept tracking device comprising: a camera for simultaneously recording a pair of missile trajectories and images; a film plate carried by said camera; means within said camera defining first and second apertures for restricting the exposed portions of said plate to a small area immediately surrounding said image; a first telescope assembly including a first telescope mounted adjacent a first side of said camera for rotation about a plurality of mutually perpendicular axes; a second telescope assembly having a second telescope mounted adjacent a second side of said camera for rotation about a plurality of mutually perpendicular axes; a first drive means for rotating said first telescope about a first axis of rotation; a second drive means for rotating said aperture defining means about a second axis; control means carried by said second telescope and responsive to rotation thereof for controlling said first and second drive means; a third drive means for rotating said aperture defining means about a third axis perpendicular to said second axis; a fourth drive means for rotating said second telescope; second control means carried by said first telescope and responsive to rotation thereof for controlling said third and fourth drive means; a fifth drive means for rotating a first of said aperture defining means about an axis perpendicular to both said second and third axes; third control means carried by said first telescope and responsive to rotation thereof for controlling said fifth drive means; sixth drive means for rotating a second of said aperture defining means about an axis perpendicular to both said second and third axes; and fourth control means carried by said second telescope and responsive to rotation thereof for controlling said sixth drive means.

4. A device as set forth in claim 3, wherein said camera includes: a housing and an inwardly extending lens barrel carried by said housing; a main platform mounted for rotation about the longitudinal axis of said lens barrel; a secondary platform carried by said main platform for movement about a second axis normal to said first axis; said aperture defining means movably carried by said secondary platform; first power means carried by said main platform for driving said main platform about said lens barrel and simultaneously rotating said aperture defining means about said first axis; second power means carried by said main platform for driving said secondary platform and said aperture defining means about said second axis; and a third power means carried by said secondary platform for independently moving said aperture defining means about a third axis normal to both said first and second axes.

5. A device as set forth in claim 4, wherein said means defining first and second apertures comprises: two half-sections of a frustum of a hollow cone mounted in a facing relationship; a first pair of cone-shaped roller means mounted on the facing edges of a first one of said half-sections; a second pair of cone-shaped roller means mounted on the facing edges of a second one of said half-sections; a plurality of arms pivotally mounted on said half-sections for supporting the lower ends of said rollers; a plurality of swivel joints secured to said half-sections for supporting the upper ends of said rollers; first and second opaque cloth-like panels fastened to adjacent rollers of opposite half-sections; spring means mounted internally of said second pair of roller means for forcing said roller means to rotate about their axes; whereby said panels are rolled about said roller means when said half-sections are in conjunction and meet at the bottom and close the extended opening between the apertures when said half-sections diverge.

6. A device as set forth in claim 5, which further comprises a first pair of cams attached to said first pair of roller means and a second pair of cams attached to said second pair of roller means, whereby said first pair of cams engages said second pair of cams for forcing said arms to swing aside upon convergence of said half-sections thereby permitting said apertures to merge.

7. A device as set forth in claim 6, wherein said aperture defining means includes a segmented trapping device for delaying the merging of said apertures comprising a U-shaped member having its bight portion secured to a first of said half-sections, a plurality of trapping plates pivotally secured to a leg of said U-shaped member, spring means for biasing said plates into contact with both legs of said U-shaped member, and a cam member depending from a second of said half-sections for forcing said plates to swing downwardly when said half-sections approach conjunction, thereby permitting said apertures to merge.

8. A device as set forth in claim 4, wherein said means for defining first and second apertures comprises a skirt assembly having the shape of a wide, blunt wedge having its narrow edge adjacent said film plane, a pair of aperture plates, a pair of rollers disposed at each end of said skirt, screening ribbons extending between said rollers for movably carrying said aperture plates, and a control arm attached to each said plate and adapted to be driven by said third power means.

9. A device as set forth in claim 8, wherein the screening ribbons of said first and second aperture defining means are disposed in an overlapping relationship, thereby closing the narrow end of said skirt.

10. A device as set forth in claim 3, wherein each of said telescope assemblies comprises a support bearing assembly including an inner race, an outer race and ball bearings supported between said races, a base for supporting said bearing assembly, means for rotating said inner race, a potentiometer carried by said base, means responsive to rotation of said inner race for varying said potentiometer, an outer trunnion rotatably carried by said inner race, said trunnion having an axis extending along a diameter of said bearing assembly, a second potentiometer carried by said outer race, means responsive to rotation of said outer trunnion for varying said second potentiometer, an inner trunnion rotatably carried by said outer trunnion for supporting a telescope and having an axis displaced 90° from the axis of said outer trunnion, a third potentiometer carried by said outer trunnion, and means responsive to rotation of said inner trunnion for varying said third potentiometer.

References Cited by the Examiner

UNITED STATES PATENTS 1,782,860 11/30 Reipert ---------------- 95—36 X

NORTON ANSHER, *Primary Examiner.*

JOHN M. HORAN, *Examiner.*